United States Patent
Kotecha

(10) Patent No.: US 9,386,077 B2
(45) Date of Patent: Jul. 5, 2016

(54) ENHANCED VIRTUALIZED MOBILE GATEWAY IN CLOUD COMPUTING ENVIRONMENT

(75) Inventor: Lalit R. Kotecha, San Ramon, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 523 days.

(21) Appl. No.: 13/307,279

(22) Filed: Nov. 30, 2011

(65) Prior Publication Data

US 2013/0138814 A1 May 30, 2013

(51) Int. Cl.
*G06F 15/173* (2006.01)
*H04L 29/08* (2006.01)

(52) U.S. Cl.
CPC ..................... *H04L 67/10* (2013.01)

(58) Field of Classification Search
CPC .............................. H04L 47/125; H04L 67/10
USPC ......................................................... 709/226
See application file for complete search history.

(56) References Cited

U.S. PATENT DOCUMENTS

| | | | | |
|---|---|---|---|---|
| 2003/0145064 A1* | 7/2003 | Hsu et al. | ........ | 709/219 |
| 2009/0285179 A1* | 11/2009 | Jones | .......... | H04W 28/08 370/331 |
| 2011/0016214 A1* | 1/2011 | Jackson | ........ | 709/226 |
| 2011/0078303 A1* | 3/2011 | Li et al. | ........ | 709/224 |
| 2011/0153735 A1* | 6/2011 | Eisenberg | .... | 709/203 |
| 2011/0264906 A1* | 10/2011 | Pourzandi et al. | .... | 713/153 |
| 2012/0173760 A1* | 7/2012 | Jog et al. | ........ | 709/245 |
| 2013/0066940 A1* | 3/2013 | Shao | .......... | 709/201 |

* cited by examiner

*Primary Examiner* — June Sison
*Assistant Examiner* — Steven Nguyen

(57) ABSTRACT

A device receives load information associated with one or more mobile gateways or server devices provided in cloud networks, and receives functionality information associated with the one or more mobile gateways or server devices provided in the cloud networks. The device also receives, from a user equipment, a request for a resource provided in one or more of the cloud networks, and selects one of the cloud networks to serve the request based on the load information and the functionality information. The device provides, to the user equipment, an indication of the selected cloud network, where the user equipment connects to the selected cloud network and receives the resource.

21 Claims, 7 Drawing Sheets

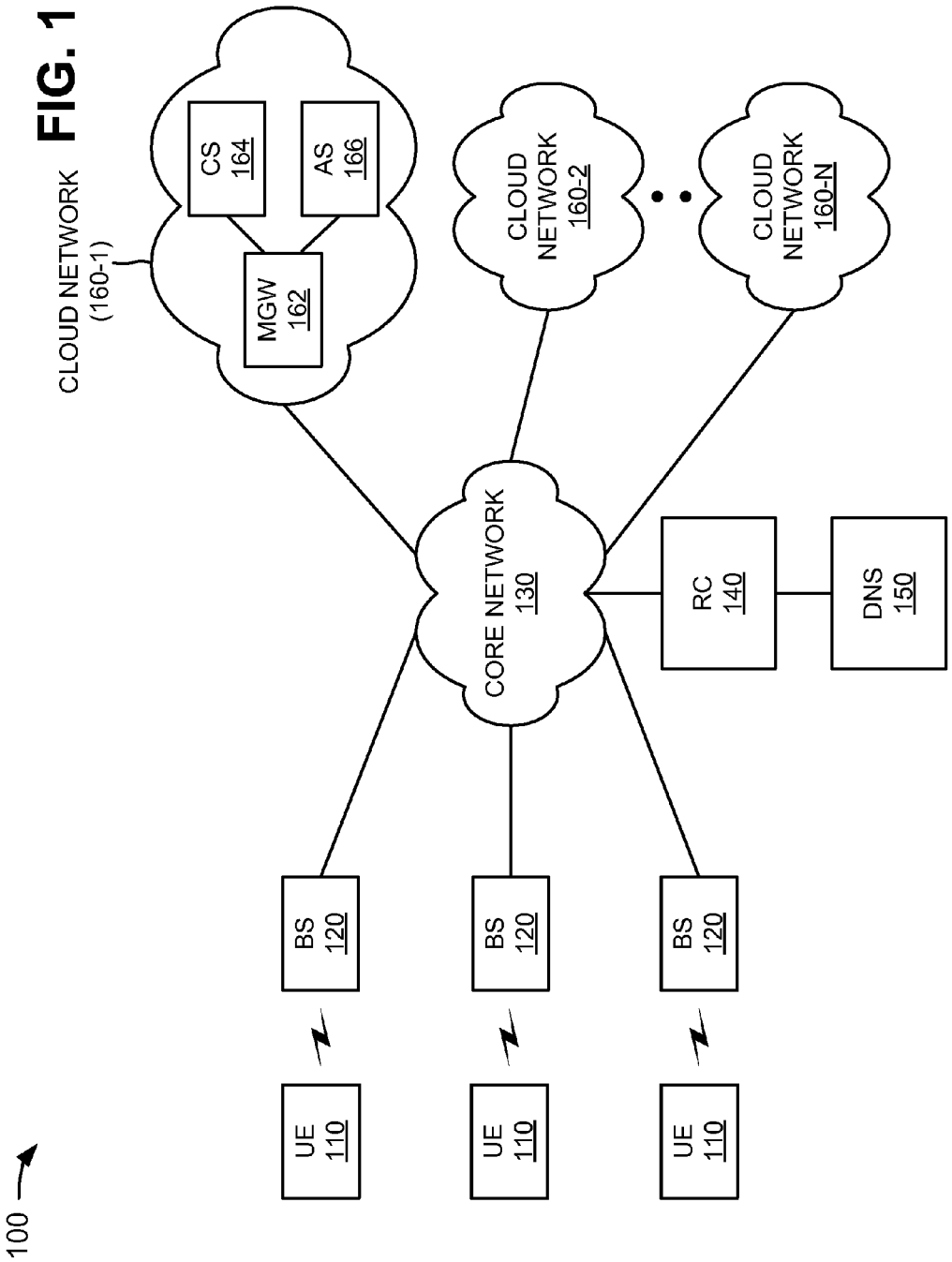

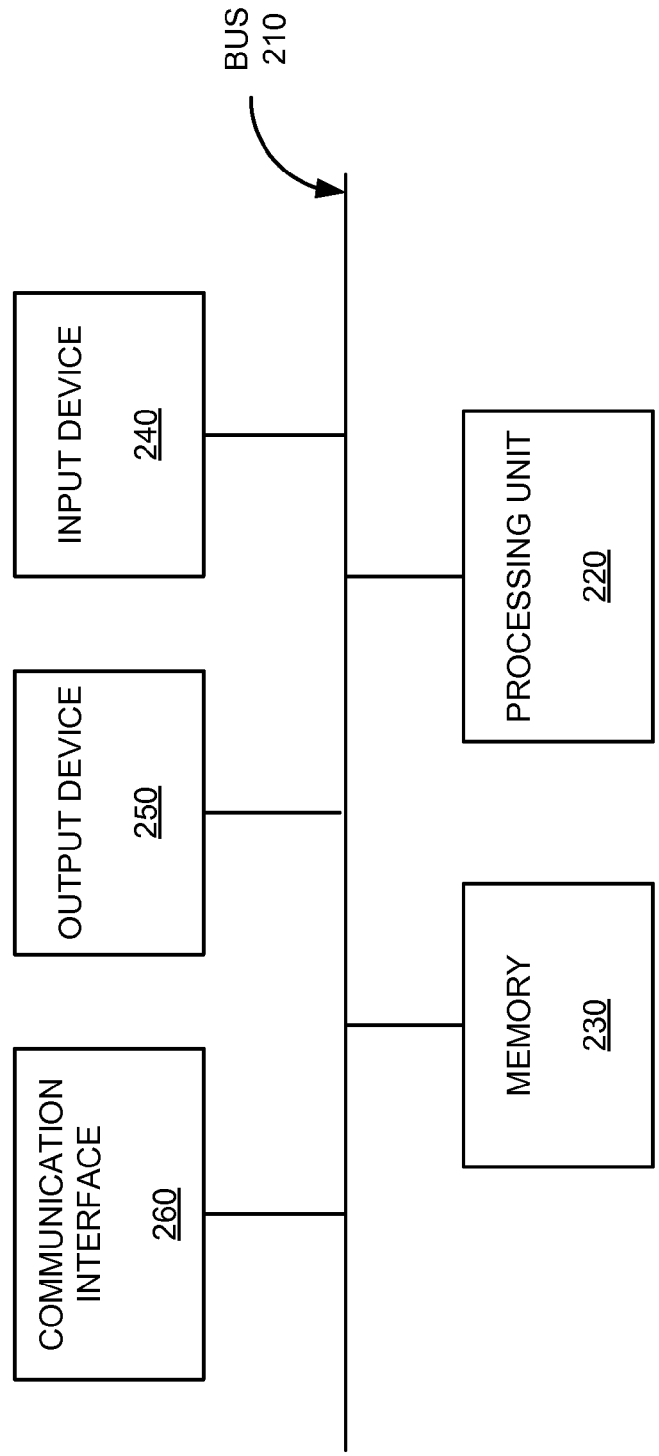

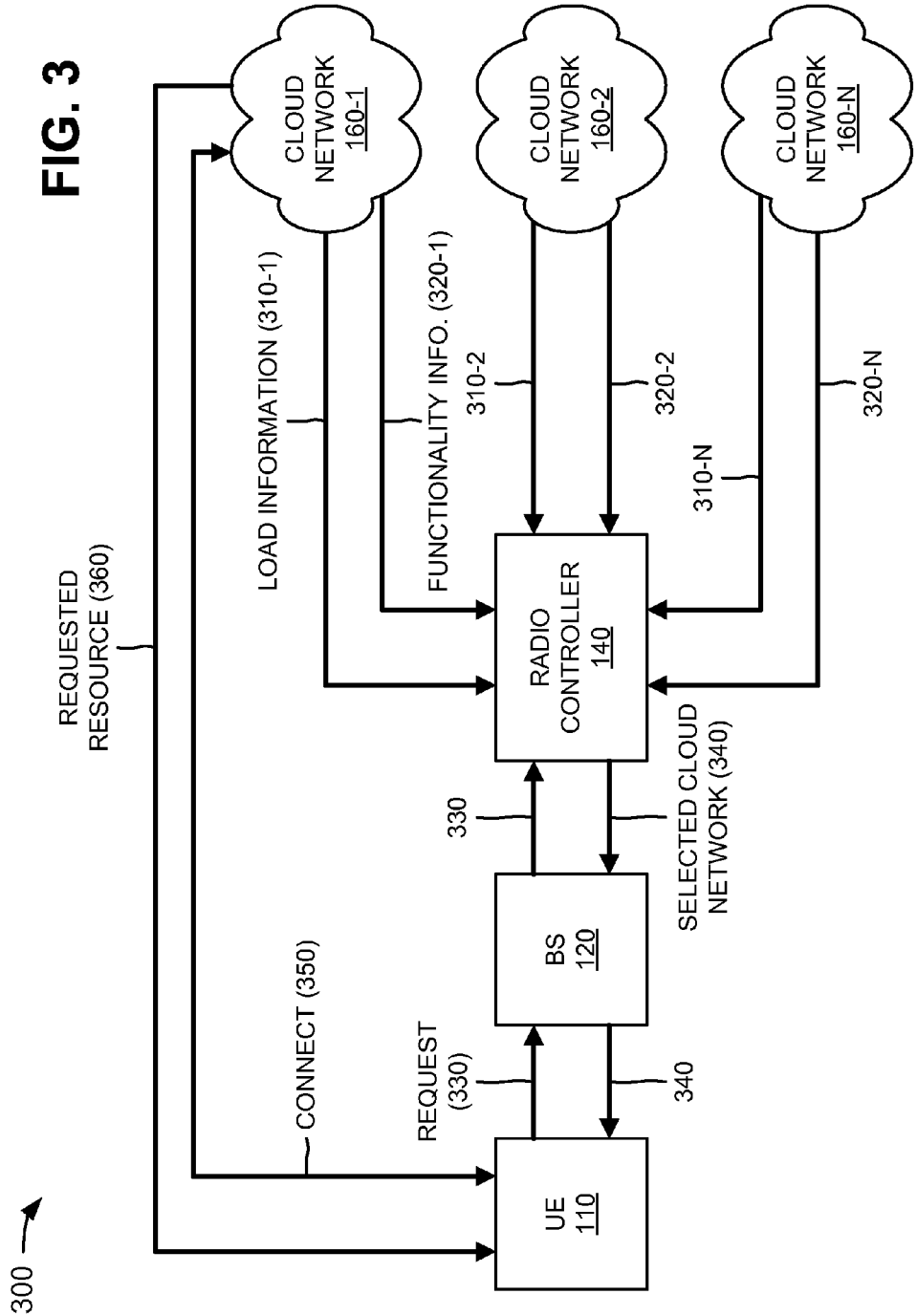

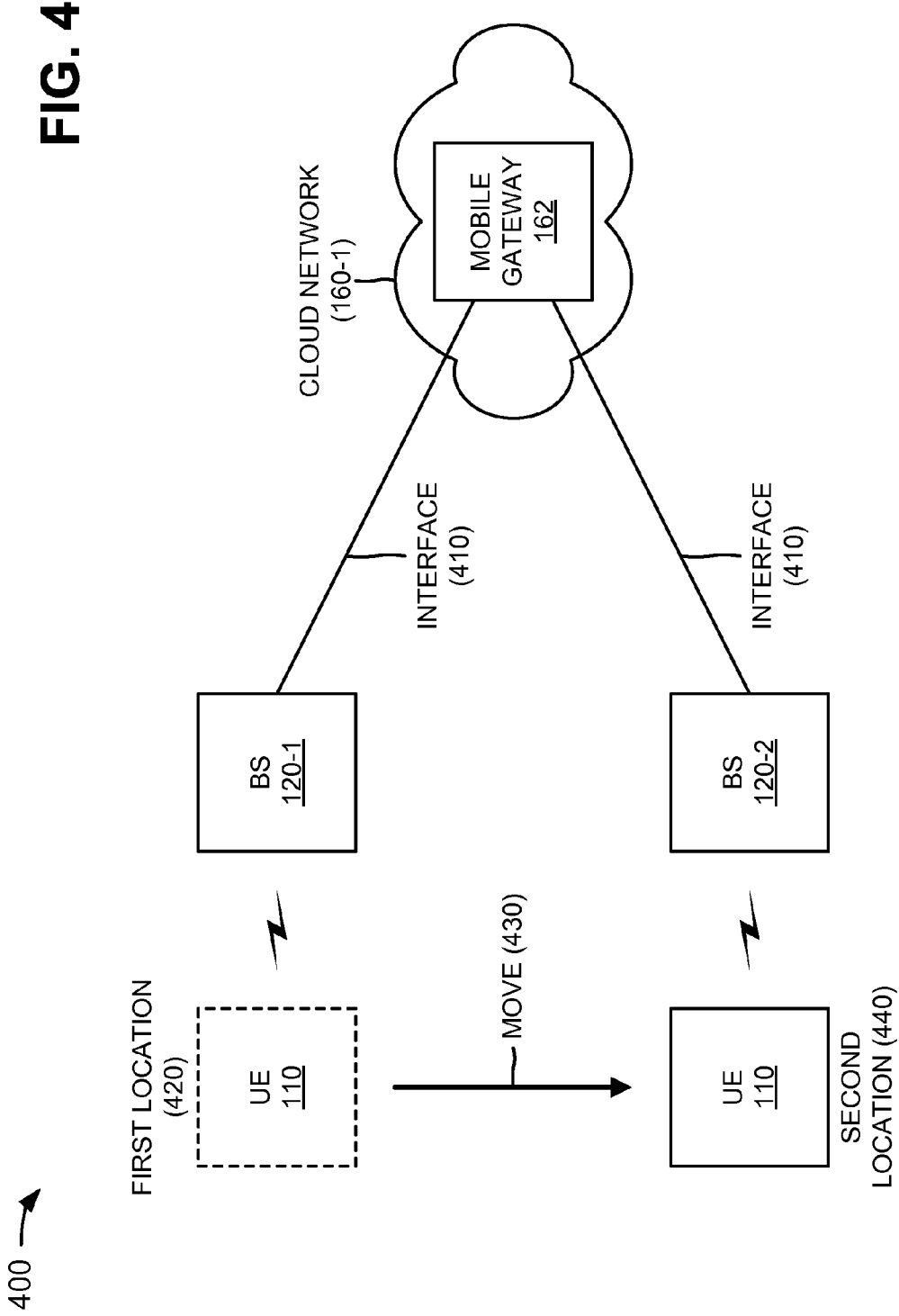

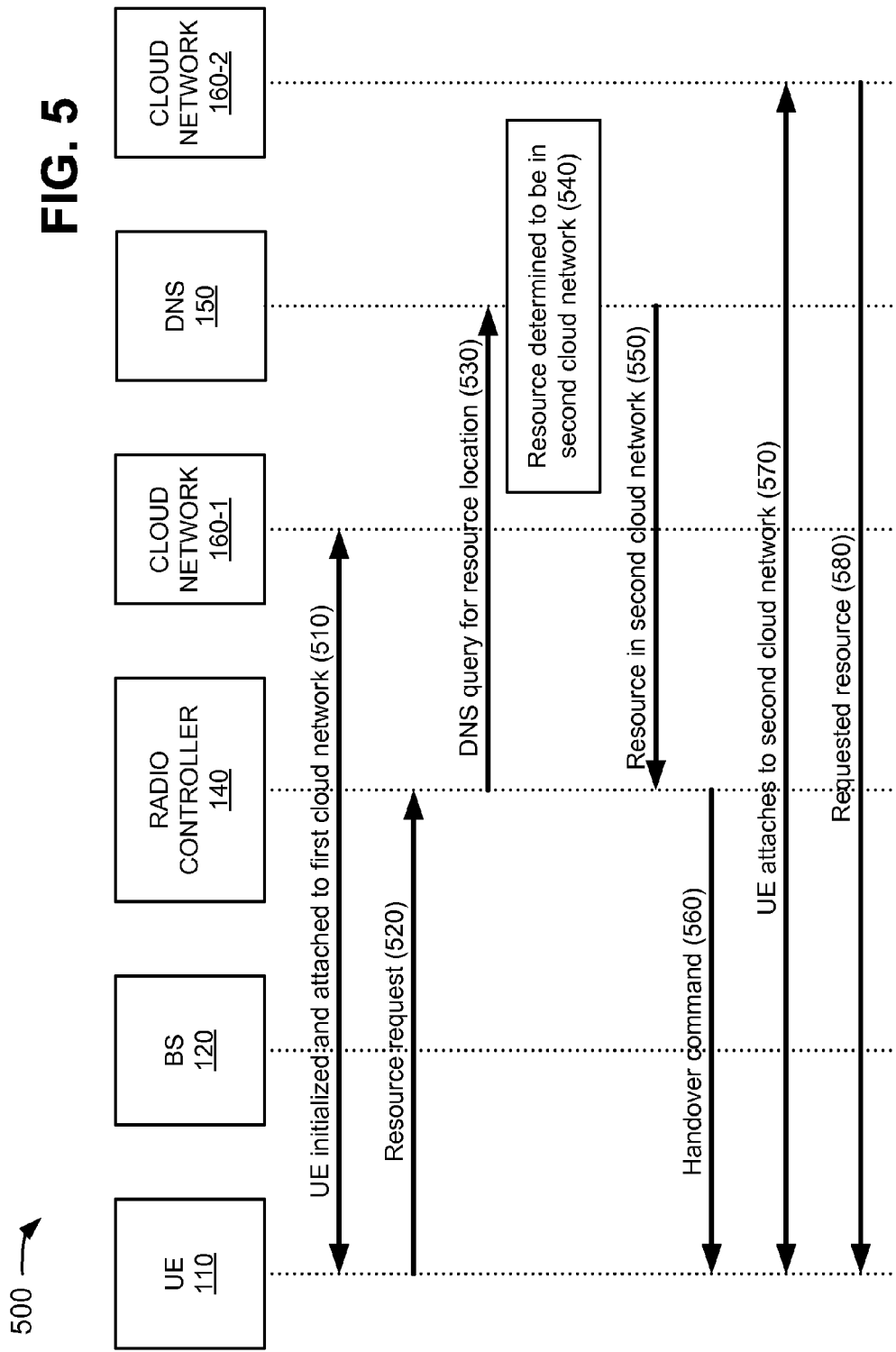

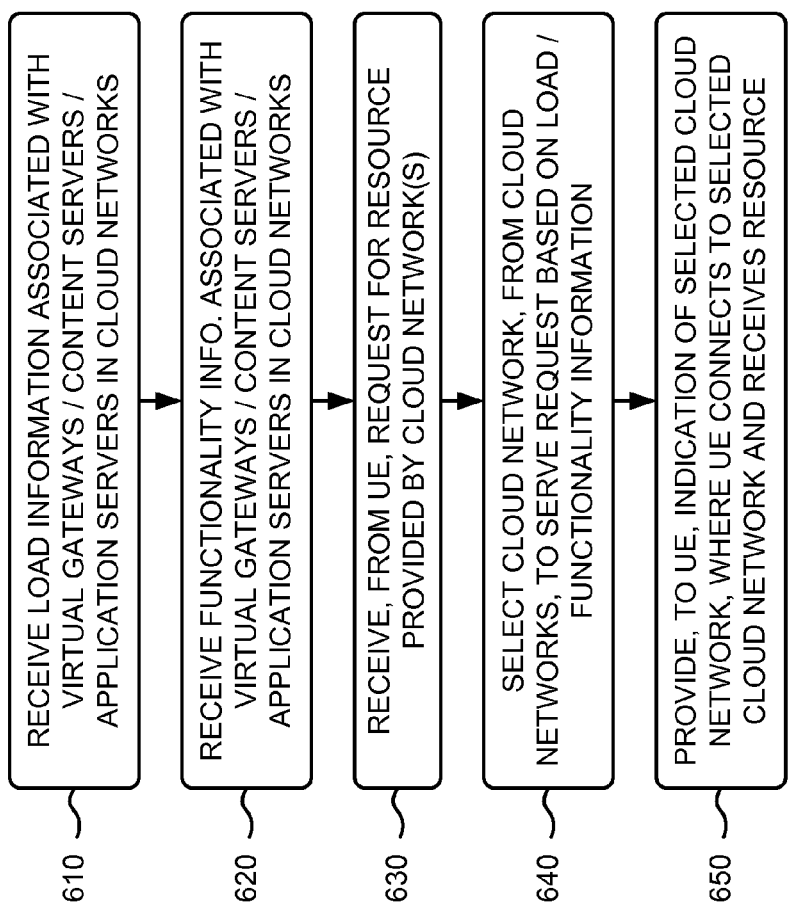

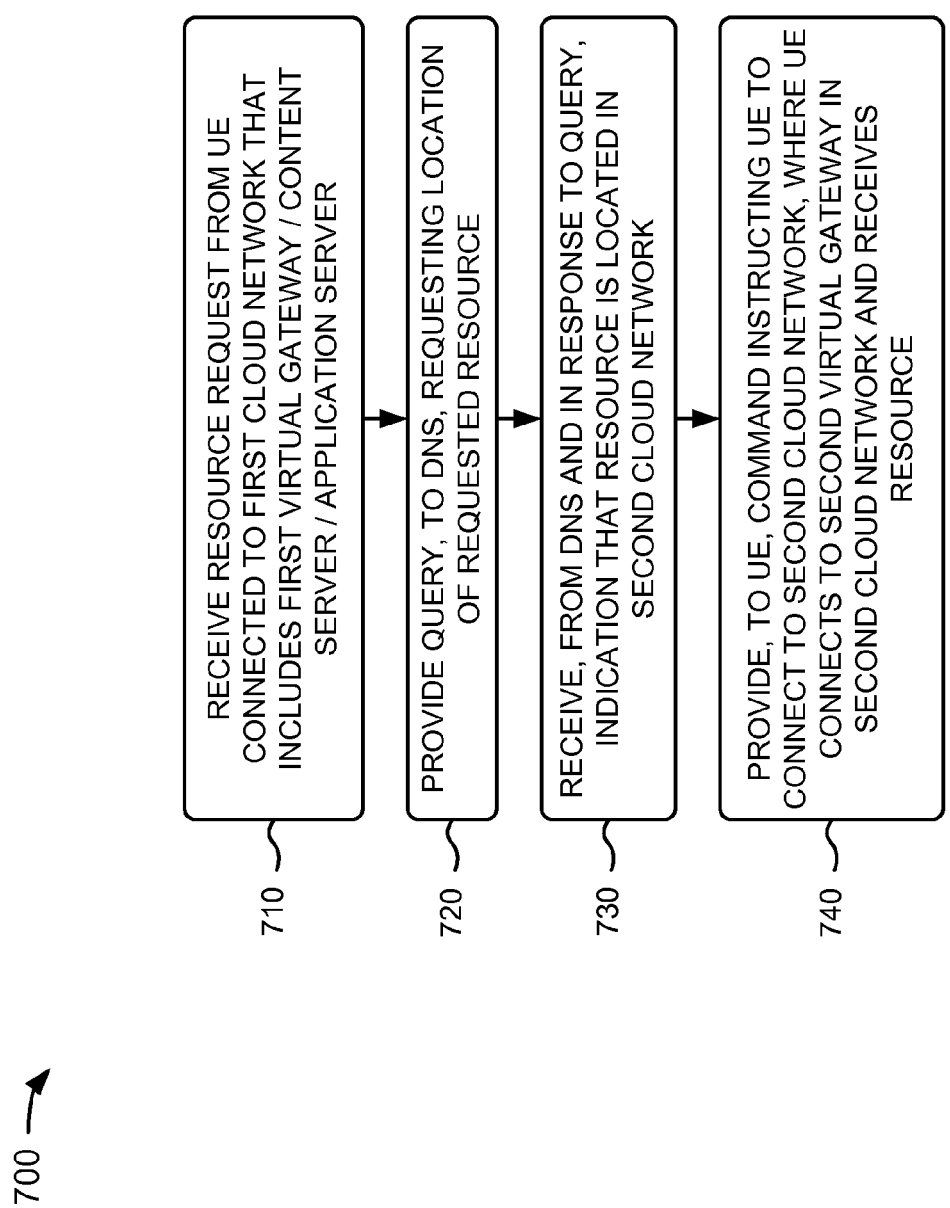

ENHANCED VIRTUALIZED MOBILE GATEWAY IN CLOUD COMPUTING ENVIRONMENT

BACKGROUND

A fourth generation (4G) wireless network is an all Internet protocol (IP) wireless network in which different advanced multimedia application services (e.g., voice over IP (VoIP) content, video content, etc.) are delivered over IP. 4G wireless networks include a radio access network, such as, for example, a long term evolution (LTE) network or an enhanced high rate packet data (eHRPD) network. 4G wireless networks also include an IP multimedia subsystem (IMS) network and a wireless core network, referred to as an evolved packet core (EPC) network. The LTE network is often called an evolved universal terrestrial radio access network (E-UTRAN). The EPC network is an all-IP packet-switched core network that supports high-speed wireless and wireline broadband access technologies. An evolved packet system (EPS) is defined to include the LTE (or eHRPD) network and the EPC network.

Cloud computing is the delivery of computing as a service rather than as a product, whereby shared resources, software, and information are provided to client devices (e.g., computers, smart phones, etc.) as a utility over a secure or an unsecure network, such as the Internet. Cloud computing environments provide computation, software, data access, network resources, and/or storage services that do not require end-user knowledge of a physical location and configuration of a system that delivers the services.

Today, a large portion of mobile content and applications are being virtually provided in cloud computing environments. Examples of such mobile content and applications include mobile gaming, music, videos, podcasts, movies, etc. Service providers are pushing the mobile content and applications to mobile devices via distributed and radio optimized content delivery networks (CDNs) provided in a cloud computing environment.

BRIEF DESCRIPTION OF THE DRAWINGS

FIG. 1 is a diagram of an example network in which systems and/or methods described herein may be implemented;

FIG. 2 is a diagram of example components of a device that may correspond to one of the devices of the network depicted in FIG. 1;

FIG. 3 is a diagram of example operations capable of being performed by an example portion of the network in FIG. 1;

FIG. 4 is a diagram of example operations capable of being performed by another example portion of the network in FIG. 1;

FIG. 5 is a flow diagram of example operations capable of being performed by still another example portion of the network in FIG. 1;

FIG. 6 is a flow chart of an example process for load balancing and selecting virtualized mobile gateways according to an implementation described herein; and FIG. 7 is a flow chart of an example process for switching a user equipment from one virtualized mobile gateway to another virtualized mobile gateway according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enhance mobile network architectures by virtually providing core network gateways in a cloud computing environment. The virtual core network gateways (referred to herein as "virtual gateways" or "mobile gateways") may include the functionality of one or more devices, such as a packet data serving node (PDSN), a home agent (HA), a serving general packet radio services (GPRS) support node (SGSN), a gateway GPRS support node (GGSN), a serving gateway (SGW), a packet data network (PDN) gateway (PGW), a multimedia broadcast multicast system gateway (MBMS-GW), a broadcast multicast service control (BMSC), etc.

In one example implementation, a radio controller may receive load information and functionality information associated with virtual gateways, content servers, and/or application servers provided in cloud networks. The radio controller may receive, from a UE, a request for a resource provided by one or more of the cloud networks, and may select a cloud network, from the cloud networks, to serve the request based on the load information and/or the functionality information. The radio controller may provide, to the UE, an indication of the selected cloud network, and the UE may connect to the selected cloud network and receive the resource.

As used herein, the term "user" is intended to be broadly interpreted to include a user equipment (UE), or a user of a UE.

The term "resource," as used herein, is intended to be broadly construed to include content, such as video, audio, images, software downloads, etc.; a service, such as delivering high-definition and user-generated content, consumer and business news and information services, an email system, network processing, storage services, etc.; and/or a combination of content and services.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include UEs 110, base stations (BSs) 120, a core network 130, a radio controller (RC) 140, a domain name server (DNS) 150, and cloud networks 160-1 through 160-N (collectively referred to herein as "cloud networks 160," and, in some instances, singularly as "cloud network 160"). Each cloud network 160 may include a mobile gateway (MGW) 162, a content server 164, and/or an application server 166. Devices and/or networks of network 100 may interconnect via wired and/or wireless connections. Three UEs 110, three BSs 120, one core network 130, one radio controller 140, one DNS 150, three cloud networks 160, one mobile gateway 162, one content server 164, and one application server 166 have been illustrated in FIG. 1 for simplicity. In practice, there may be more UEs 110, BSs 120, core networks 130, radio controllers 140, DNSs 150, cloud networks 160, mobile gateways 162, content servers 164, and/or application servers 166.

UE 110 may include any device that is capable of communicating with BSs 120, core network 130, radio controller 140, and/or cloud networks 160. For example, UE 110 may include a mobile computation and/or communication device, such as a radiotelephone, a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smart phone; a laptop computer with a wireless air card; a global positioning system (GPS) device; a content recording device (e.g., a camera, a video camera, etc.); a set-top box (STB); a voice over Internet protocol (VoIP) device; an analog terminal adaptor (ATA); etc. Alternatively, or additionally, UE 110 may include a fixed (e.g., provided in a particular location, such as within a user's home) computation and/or communication device, such as a laptop computer, a personal computer, a tablet computer, a STB, a television, a gaming system, etc.

BS 120 may include one or more computation and/or communication devices that receive traffic (e.g., voice and/or data) from a mobile gateway 162 of a cloud network 160 and wirelessly transmit that traffic to UE 110. BS 120 may also include one or more devices that wirelessly receive traffic from UE 110 and transmit that traffic to a mobile gateway 162 of a cloud network 160 or to other UEs 110. BS 120 may combine the functionalities of a base station and/or a radio network controller (RNC) in second generation (2G) or third generation (3G) radio access networks.

Core network 130 may include a core network architecture of the Third Generation Partnership Project (3GPP) Long Term Evolution (LTE) wireless communication standard. In one example, core network 130 may include an all-IP packet-switched core network that supports high-speed wireless and wireline broadband access technologies. In another example, core network 130 may provide packet-switched voice services (e.g., which are traditionally circuit-switched). Alternatively, or additionally, core network 130 may include a core network architecture of 2G or 3G wireless communication standards.

Radio controller 140 may include one or more computation and/or communication devices that provide the functionality of a RNC and/or a mobility management entity (MME). The RNC functionality of radio controller 140 may include controlling and managing one or more BSs 120, and performing data processing to manage utilization of radio network services. With regard to the MME functionality, radio controller 140 may provide idle mode tracking and paging procedures (e.g., including retransmissions) for UE 110. Radio controller 140 may be involved in a bearer activation/deactivation process (e.g., for UE 110) and may choose a mobile gateway 162 for UE 110 at an initial attach and at a time of intra-LTE handover. Radio controller 140 may authenticate UE 110, and non-access stratum (NAS) signaling may terminate at radio controller 140. Radio controller 140 may generate and allocate temporary identities to UEs 110, may check authorization of UE 110 to camp on a service provider's Public Land Mobile Network (PLMN), and may enforce roaming restrictions for UE 110. Radio controller 140 may be a termination point in core network 130 for ciphering/integrity protection for NAS signaling and may handle security key management.

In one example implementation, radio controller 140 may receive load information and functionality information associated with mobile gateways 162, content servers 164, and/or application servers 166 provided in cloud networks 160. Radio controller 140 may receive, from UE 110, a request for a resource provided by one or more of cloud networks 160, and may select a cloud network 160 (e.g., cloud network 160-1) to serve the request based on the load information and/or the functionality information. Radio controller 140 may provide, to UE 110, an indication of the selected cloud network 160, and UE 110 may connect to the selected cloud network 160 and receive the resource.

Alternatively, or additionally, radio controller 140 may receive a resource request from UE 110 when UE 110 is connected to mobile gateway 162 of cloud network 160-1, and may provide a query, to DNS 150, requesting a location of the requested resource. Radio controller 140 may receive, from DNS 150 and in response to the query, an indication that the resource is located in cloud network 160-2. Radio controller 140 may provide, to UE 110, a command instructing UE 110 to connect to cloud network 160-2, and UE 110 may connect to mobile gateway 162 (not shown) in cloud network 160-2 and may receive the resource.

DNS 150 may include one or more server devices, or other types of computation and/or communication devices, that gather, process, search, and/or provide information in a manner described herein. In one example implementation, DNS 150 may include a hierarchical naming system for computers, services, and/or any resource participating in a network, such as network 100. DNS 150 may associate various information with domain names assigned to each participant, and may translate domain names meaningful to humans into numerical (e.g., binary) identifiers associated with network devices for purposes of locating and addressing these devices.

Cloud network 160 may include a network of one or more computation and/or communication devices that deliver computing as a service rather than as a product, whereby shared resources, software, and information may be provided to UE 110 as a utility over a network. Cloud network 160 may provide resources that do not require user (e.g., UE 110) knowledge of a physical location and configuration of a system that delivers the resources. Although FIG. 1 shows cloud network 160 as containing mobile gateway 162, content server 164, and application server 166, cloud network 160 may, alternatively, or additionally, include other network devices, such as Internet services devices, routers, gateways, etc.

Mobile gateway 162 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example, mobile gateway 162 may include functionality that is suitable for cloud networks 160, and may include hardware and/or software that is undedicated to a particular service provider and may be modified (i.e., is "elastic"). In one example implementation, mobile gateway 162 may include the functionality of one or more of a PDSN, a HA, a SGSN, a GGSN, a SGW, a PGW, a MBMS-GW, a BMSC, etc.

The PDSN functionality of mobile gateway 162 may include acting as a connection point between a radio access network and an IP network, and managing point-to-point protocol (PPP) sessions between core network 130 and UE 110. The HA functionality of mobile gateway 162 may include maintaining information about a current location of UE 110, as identified in a care-of address or current point of attachment of UE 110. The HA functionality may also include using tunneling mechanisms to forward traffic so that the IP address of UE 110 does not have to be changed each time UE 110 connects from a different location.

The SGSN functionality of mobile gateway 162 may include delivering data packets to and from UEs 110 within a geographical service area. The SGSN functionality may also include packet routing and transfer, mobility management, logical link management, authentication and charging functions, storing location information and user profiles, etc. The GGSN functionality of mobile gateway 162 may include receiving traffic addressed to a specific UE 110, and checking if the specific UE 110 is active. The GGSN functionality may also include converting GPRS packets into the appropriate packet data protocol (PDP) format, and sending the packets to a corresponding PDN.

The SGW functionality of mobile gateway 162 may include routing and forwarding user data packets, acting as a mobility anchor for a user plane during inter-eNB handovers, and acting as an anchor for mobility between LTE and other 3GPP technologies. The PGW functionality of mobile gateway 162 may include providing connectivity of UE 110 to external PDNs by being a traffic exit/entry point for UE 110, and performing policy enforcement, packet filtering for each user, charging support, lawful intercept, and packet screening.

The MBMS-GW functionality of mobile gateway 162 may include providing delivery of broadcast and multicast services within a cell and within core network 130, and defining transmission via single-frequency network configurations for broadcast transmission across multiple cells. The BMSC functionality of mobile gateway 162 may include providing an interface for the control plane, an interface for the user plane, a web services-based provisioning interface, a notification interface, file ingestion interfaces, etc.

Content server 164 may include one or more server devices, or other types of computation or communication devices, that gather, process, search, and/or provide information in a manner described herein. In one example implementation, content server 164 may include a computer system, an application, a cable head-end, and/or a broadcasting device capable of providing video content, audio content, audio and video content, instructions, and/or other information to UE 110.

Application server 166 may include one or more server devices, or other types of computation or communication devices, that gather, process, search, and/or provide information in a manner described herein. In an example implementation, application server 166 may store one or more applications that use resources provided by network 100. The applications may include applications that determine locations of UEs 110, applications that connect calls between UE 110 and other UEs 110, voicemail applications, etc. The applications, via application server 166, may provide services to end users associated with UEs 110, and may make requests for other services to network resources associated with network 100. Alternatively, or additionally, one or more of the applications may be permanently stored on UE 110 or may be retrieved from application server 166 and temporarily stored on UE 110.

In one example implementation, the arrangement depicted in FIG. 1 may provide auto redundancy since mobile gateways 162 may be distributed, geographically separated, and provided in separate hardware platforms. Furthermore, mobile gateways 162 may provide functionality for different wireless technologies, such as 3G technologies, 4G technologies (e.g., LTE, WiMAX, etc.), etc. The arrangement depicted in FIG. 1 may enable implementation of a mobile virtual network operation (MVNO) through hosted and/or outsourced mobile gateways 162, content servers 164, and/or application servers 166 sharing a common radio access network. For example, in a MVNO scenario, BSs 120 and radio controller 140 may be shared by multiple UEs 110, and each UE 110 may be associated with a particular cloud network 160 that hosts mobile gateways 162, subscriber information, content, applications, etc. for UE 110.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of example operations capable of being performed by an example portion of network 100 (FIG. 1). As shown in FIG. 3, network portion 300 may include UE 110, BS 120, radio controller 140, and cloud networks 160-1 through 160-N. UE 110, BS 120, radio controller 140, and cloud networks 160-1 through 160-N may include the features described above in connection with, for example, one or more of FIGS. 1 and 2.

As further shown in FIG. 3, one or more components (not shown) of cloud network 160-1 may provide load information 310-1 and functionality information 320-1 to radio controller 140, and radio controller 140 may receive load information 310-1 and functionality information 320-1. Load information 310-1 may include information associated with loads (e.g., based on percent utilization, bandwidth utilization, etc.) provided on mobile gateway 162, content server 164, application server 166, and/or any other network devices included in cloud network 160-1; information associated with content stored in content server 164; information associated with applications stored in application server 166; etc. Functionality information 320-1 may include information associated with functionalities of mobile gateway 162, content server 164, application server 166, and/or any other network devices included in cloud network 160-1. For example, functionality information 320-1 may include information specifying whether mobile gateway 162 includes the functionality of one or more of a PDSN, a HA, a SGSN, a GGSN, a SGW, a PGW, a MBMS-GW, a BMSC, etc.

One or more components (not shown) of cloud network 160-2 may provide load information 310-2 and functionality information 320-2 to radio controller 140, and radio controller 140 may receive load information 310-2 and functionality information 320-2. Load information 310-2 may include information associated with loads provided on mobile gateway 162, content server 164, application server 166, and/or any other network devices included in cloud network 160-2; information associated with content stored in content server 164; information associated with applications stored in application server 166; etc. Functionality information 320-2 may include information associated with functionalities of mobile gateway 162, content server 164, application server 166, and/or any other network devices included in cloud network 160-2.

One or more components (not shown) of cloud network 160-N may provide load information 310-N and functionality information 320-N to radio controller 140, and radio controller 140 may receive load information 310-N and functionality information 320-N. Load information 310-N may include information associated with loads provided on mobile gateway 162, content server 164, application server 166, and/or any other network devices included in cloud network 160-N; information associated with content stored in content server 164; information associated with applications stored in application server 166; etc. Functionality information 320-N may include information associated with functionalities of mobile gateway 162, content server 164, application server 166, and/or any other network devices included in cloud network 160-N.

As further shown in FIG. 3, UE 110 may generate a request 330 for a resource that may be provided by one or more of cloud networks 160. In one example, request 330 may include a request for video content stored in a content server 164 of one or more of cloud networks 160. UE 110 may provide request 330 to BS 120, and BS 120 may provide request 330 to radio controller 140. Radio controller 140 may receive request 330, and may select one of cloud networks 160 (e.g., cloud network 160-1) to serve request 330 based on load information 310-1 through 310-N and/or functionality information 320-1 through 320-N. In one example implementation, radio controller 140 may select one of cloud networks 160 based on loads on mobile gateways 162, content servers 162, and/or application servers 164, based on functionalities of mobile gateways 162, based on where the requested resource is located, etc. For example, if cloud networks 160-1 and 160-2 store the requested resource and cloud network 160-1 is less loaded than cloud network 160-2, radio controller 140 may select cloud network 160-1 to serve request 330. In another example, radio controller 140 may utilize the selection of cloud networks 160 to balance the loads experienced by mobile gateways 162, content servers 164, application servers 166, etc. of cloud networks 160.

Radio controller 140 may provide, to BS 120, an indication 340 of the selected cloud network 160, and BS 120 may provide indication 340 to UE 110. In one example, indication 340 may indicate that the requested resource is provided in cloud network 160-1. Based on indication 340, UE 110 may connect to the selected cloud network 160 (e.g., to mobile gateway 162 of cloud network 160-1), as indicated by reference number 350. After connecting to cloud network 160-1, UE 110 may receive the requested resource from cloud network 160-1 (e.g., from content server 164 of cloud network 160-1), as indicated by reference number 360.

Although FIG. 3 show example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

FIG. 4 is a diagram of example operations capable of being performed by another example portion 400 of network 100 (FIG. 4). As shown in FIG. 4, network portion 400 may include UE 110, BSs 120 (depicted as BS 120-1 and BS 120-2), cloud network 160-1, and mobile gateway 162. UE 110, BSs 120, cloud network 160-1, and mobile gateway 162 may include the features described above in connection with, for example, one or more of FIGS. 1-3.

As further shown in FIG. 4, BSs 120-1 and BS 120-2 may each include an interface 410, such as a S1-U interface, with mobile gateway 162. When UE 110 is provided at a first location 420, UE 110 may communicate with mobile gateway 162 via BS 120-1 and interface 410. When UE 110 moves, as indicated by reference number 430, from first location 420 to a second location 440, UE 110 may continue to communicate with mobile gateway 162. However, at second location 440, UE 110 may communicate with mobile gateway 162 via BS 120-2 and interface 410. In one example implementation, there may be no need for an IP handover when UE 110 moves from first location 420 to second location 440 since mobile gateway 162 is a virtual function that connects with BS 120-1 and BS 120-2 via interface 410. For example, as UE 110 moves from BS 120-1 to BS 120-2, the S1-U interface may move from BS 120-1 and mobile gateway 162 to BS 120-2 and mobile gateway 162 without an IP handover.

Although FIG. 4 show example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

FIG. 5 is a flow diagram of example operations capable of being performed by still another example portion 500 of network 100 (FIG. 1). As shown in FIG. 5, network portion 500 may include UE 110, BS 120, radio controller 140, DNS 150, cloud network 160-1, and cloud network 160-2. UE 110, BS 120, radio controller 140, DNS 150, cloud network 160-1, and cloud network 160-2 may include the features described above in connection with, for example, one or more of FIGS. 1-4.

As further shown in FIG. 5, UE 110 may be initialized and attached to cloud network 160-1, as indicated by reference number 510. UE 110 may provide a resource request 520 to radio controller 140, and radio controller 140 may receive resource request 520. Resource request 520 may include a request for a resource (e.g., content) provided in cloud network 160-1 and/or cloud network 160-2. Based on resource request 520, radio controller 140 may provide a query 530, to DNS 150, requesting a location of the requested resource. DNS 150 may receive query 530, and may determine, based on query 530, that the requested resource is located in cloud network 160-2, as indicated by reference number 540.

Based on query 530 and the determination of the location of the requested resource, DNS 150 may provide, to radio controller 140, an indication 550 that the requested resource is located in cloud network 160-2. Radio controller 140 may receive indication 550 that the requested resource is located in cloud network 160-2. In response to indication 550, radio controller 140 may provide, to UE 110, a handover command 560 that instructs UE 110 to connect to cloud network 160-2 in order to receive the requested resource. Based on handover command 560, UE 110 may attach to cloud network 160-2, as indicated by reference number 570, and may retrieve the requested resource from cloud network 160-2, as indicated by reference number 580.

Although FIG. 5 show example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

FIG. 6 is a flow chart of an example process 600 for load balancing and selecting virtualized mobile gateways according to an implementation described herein. In one implementation, process 600 may be performed by radio controller 140. Alternatively, or additionally, some or all of process 600 may be performed by another device or group of devices, including or excluding radio controller 140.

As shown in FIG. 6, process 600 may include receiving load information associated with virtual gateways, content servers, and/or application servers provided in cloud networks (block 610), and receiving functionality information associated with the virtual gateways, the content servers, and/or the application servers in the cloud networks (block 620). For example, in an implementation described above in connection with FIG. 3, one or more components of cloud network 160-1 may provide load information 310-1 and functionality information 320-1 to radio controller 140, and radio controller 140 may receive load information 310-1 and functionality information 320-1. One or more components of cloud network 160-2 may provide load information 310-2 and functionality information 320-2 to radio controller 140, and radio controller 140 may receive load information 310-2 and functionality information 320-2. One or more components of cloud network 160-N may provide load information 310-N and functionality information 320-N to radio controller 140, and radio controller 140 may receive load information 310-N and functionality information 320-N.

As further shown in FIG. 6, process 600 may include receiving, from a user equipment (UE), a request for a resource provided by one or more of the cloud networks (block 630), and selecting a cloud network, from the cloud networks, to serve the request based on the load information and/or the functionality information (block 640). For example, in an implementation described above in connection with FIG. 3, UE 110 may generate request 330 for a resource that may be provided by one or more of cloud networks 160. In one example, request 330 may include a request for video content stored in a content server 164 of one or more of cloud networks 160. UE 110 may provide request 330 to BS 120, and BS 120 may provide request 330 to radio controller 140. Radio controller 140 may receive request 330, and may select one of cloud networks 160 (e.g., cloud network 160-1) to serve request 330 based on load information 310-1 through 310-N and/or functionality information 320-1 through 320-N. In one example, radio controller 140 may select one of cloud networks 160 based on loads on mobile gateways 162, content servers 164, and/or application servers 166, based on functionalities of mobile gateways 162, based on where the requested resource is located, etc.

Returning to FIG. 6, process 600 may include providing, to the UE, an indication of the selected cloud network, where the UE connects to a virtual gateway of the selected cloud network and receives the resource (block 650). For example, in an implementation described above in connection with FIG. 3, radio controller 140 may provide, to BS 120, indication 340 of the selected cloud network 160, and BS 120 may provide indication 340 to UE 110. In one example, indication 340 may indicate that the requested resource is provided in cloud network 160-1. Based on indication 340, UE 110 may connect to the selected cloud network 160 (e.g., to mobile gateway 162 of cloud network 160-1), as indicated by reference number 350. After connecting to cloud network 160-1, UE 110 may receive the requested resource from cloud network 160-1 (e.g., from content server 164 of cloud network 160-1), as indicated by reference number 360.

FIG. 7 is a flow chart of an example process 700 for switching a user equipment from one virtualized mobile gateway to another virtualized mobile gateway according to an implementation described herein. In one implementation, process 700 may be performed by radio controller 140. Alternatively, or additionally, some or all of process 700 may be performed by another device or group of devices, including or excluding radio controller 140.

As shown in FIG. 7, process 700 may include receiving a resource request from a user equipment (UE) connected to a first cloud network that includes a first virtual gateway, a first content server, and/or a first application server (block 710), and providing a query, to a domain name server (DNS), requesting a location of the requested resource (block 720). For example, in an implementation described above in connection with FIG. 5, UE 110 may be initialized and attached to cloud network 160-1, as indicated by reference number 510. UE 110 may provide resource request 520 to radio controller 140, and radio controller 140 may receive resource request 520. Resource request 520 may include a request for a resource (e.g., content) provided in cloud network 160-1 and/or cloud network 160-2. Based on resource request 520, radio controller 140 may provide query 530, to DNS 150, requesting a location of the requested resource. DNS 150 may receive query 530, and may determine, based on query 530, that the requested resource is located in cloud network 160-2, as indicated by reference number 540.

As further shown in FIG. 7, process 700 may include receiving, from the DNS and in response to the query, an indication that the resource is located in a second cloud network (block 730), and providing, to the UE, a command instructing the UE to connect to the second cloud network, where the UE connects to a second virtual gateway in the second cloud network and receives the resource (block 740). For example, in an implementation described above in connection with FIG. 5, based on query 530 and the determination of the location of the requested resource, DNS 150 may provide, to radio controller 140, indication 550 that the requested resource is located in cloud network 160-2. Radio controller 140 may receive indication 550 that the requested resource is located in cloud network 160-2. In response to indication 550, radio controller 140 may provide, to UE 110, handover command 560 that instructs UE 110 to connect to cloud network 160-2 in order to receive the requested resource. Based on handover command 560, UE 110 may attach to cloud network 160-2, as indicated by reference number 570, and may retrieve the requested resource from cloud network 160-2, as indicated by reference number 580.

Systems and/or methods described herein may enhance mobile network architectures by virtually providing core network gateways in a cloud computing environment. The virtual core network gateways may include the functionality of one or more devices, such as a PDSN, a HA, a SGSN, a GGSN, a SGW, a PGW, a MBMS-GW, a BMSC, etc.

The foregoing description of implementations provides illustration and description, but is not intended to be exhaustive or to limit the invention to the precise form disclosed. Modifications and variations are possible in light of the above teachings or may be acquired from practice of the invention.

Furthermore, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a device, load information associated with one or more mobile gateways and one or more server devices provided in each cloud network of a plurality of cloud networks, wherein the load information includes bandwidth usage information associated with loads on the one or more mobile gateways and associated with loads on the one or more server devices, information associated with media content stored in the one or more server devices, and information associated with applications stored in the one or more server devices;
    receiving, by the device, functionality information associated with the one or more mobile gateways and the one or more server devices, wherein the functionality information includes information identifying whether the one or more mobile gateways include functionalities of: a packet data serving node (PDSN), a home agent (HA), a serving general packet radio services (GPRS) support node (SGSN), a gateway GPRS support node (GGSN), a serving gateway (SGW), a packet data network (PDN) gateway (PGW), a multimedia broadcast multicast system gateway (MBMS-GW), or a broadcast multicast service control (BMSC);
    receiving, by the device and from a user equipment, a request for a resource stored in two or more of the cloud networks;
    selecting, by the device, one cloud network of the two or more of the cloud networks to serve the request based on a comparison of the load information and the functionality information associated with the one or more mobile gateways and the one or more server devices provided in each of the two or more of the cloud networks; and
    providing, by the device and to the user equipment, an indication of the selected cloud network,
    wherein, in response to the indication, the user equipment connects to the selected cloud network via a first base station and receives the resource when the user equipment is in a first location,
    wherein the user equipment connects to the selected cloud network via a second base station, and
    wherein an interface moves from between the first base station and the selected cloud network to between the second base station and the selected cloud network without an Internet Protocol handover, when the user equipment moves from the first location to a second location.

2. The method of claim 1, wherein the load information includes:
    the bandwidth usage information associated with the loads provided on the one or more mobile gateways or server devices,
    the information associated with the media content stored in the one or more server devices, and
    the information associated with the applications stored in the one or more server devices.

3. The method of claim 1, wherein the functionality information further includes additional information associated with functionalities of the one or more mobile gateways or server devices provided in the plurality of cloud networks.

4. The method of claim 1, wherein the resource includes:
    a combination of the media content and services associated with the applications.

5. The method of claim 1, where each of the mobile gateways includes functionalities of: the PDSN, the HA, the SGSN, the GGSN, the SGW, the PGW, the MBMS-GW, and the BMSC.

6. The method of claim 1, wherein the user equipment is connected to a first cloud network of the plurality of cloud networks, and wherein the method further comprises:
    providing, to a domain name server (DNS) device, a query requesting a location of the resource;
    receiving, from the DNS device and in response to the query, an indication that the resource is located in a second cloud network of the plurality of cloud networks; and providing, to the user equipment, a command instructing the user equipment to connect to the second cloud network.

7. The method of claim 6, where the user equipment, based on the command, connects to a mobile gateway of the second cloud network and receives the resource from the second cloud network.

8. A device, comprising:
a memory storing instructions; and
a processor to execute one or more of the instructions to:
receive load information associated with one or more mobile gateways and one or more server devices provided in each cloud network of a plurality of cloud networks, wherein the load information includes bandwidth usage information associated with loads on the one or more mobile gateways and associated with loads on the one or more server devices, information associated with media content stored in the one or more server devices, and information associated with applications stored in the one or more server devices,
receive functionality information associated with the one or more mobile gateways and the one or more server devices, wherein the functionality information includes information identifying whether the one or more mobile gateways include functionalities of: a packet data serving node (PDSN), a home agent (HA), a serving general packet radio services (GPRS) support node (SGSN), a gateway GPRS support node (GGSN), a serving gateway (SGW), a packet data network (PDN) gateway (PGW), a multimedia broadcast multicast system gateway (MBMS-GW), or a broadcast multicast service control (BMSC),
receive, from a user equipment, a request for a resource stored in two or more of the cloud networks,
select one cloud network of the two or more of the cloud networks to serve the request based on a comparison of the load information or the functionality information associated with the one or more mobile gateways and the one or more server devices provided in each of the two or more of the cloud networks, and
provide, to the user equipment, an indication of the selected cloud network,
wherein, in response to the indication, the user equipment connects to the selected cloud network via a first base station and receives the resource from the selected cloud network when the user equipment is in a first location,
wherein the user equipment connects to the selected cloud network via a second base station, and
wherein an interface moves from between the first base station and the selected cloud network to between the second base station and the selected cloud network without an Internet Protocol handover, when the user equipment moves from the first location to a second location.

9. The device of claim 8, wherein the load information includes:
the bandwidth usage information associated with the loads provided on the one or more mobile gateways or the one or more server devices,
the information associated with the media content stored in the one or more server devices, and
the information associated with the applications stored in the one or more server devices.

10. The device of claim 8, wherein the functionality information further includes information associated with additional functionalities of the one or more mobile gateways or server devices provided in the plurality of cloud networks.

11. The device of claim 8, wherein the resource includes:
a combination of the media content and services associated with the applications.

12. The device of claim 8, wherein each of the mobile gateways includes functionalities of: the PDSN, the HA, the SGSN, the GGSN, the SGW, the PGW, the MBMS-GW, or the BMSC.

13. The device of claim 8, wherein the user equipment is connected to a first cloud network of the plurality of cloud networks, and wherein the processor is further to:
provide, to a domain name server (DNS) device, a query requesting a location of the resource,
receive, from the DNS device and in response to the query, an indication that the resource is located in a second cloud network of the plurality of cloud networks, and
provide, to the user equipment, a command instructing the user equipment to connect to the second cloud network.

14. The device of claim 13, where the user equipment, based on the command, connects to a mobile gateway of the second cloud network and receives the resource from the second cloud network.

15. A non-transitory computer-readable medium, comprising:
one or more instructions that, when executed by a processor of a device, cause the processor to:
receive load information associated with one or more virtual gateways and one or more server devices provided in each cloud network of a plurality of cloud networks, wherein the one or more virtual gateways include functionalities of mobile gateways provided in core networks, and wherein the load information includes bandwidth usage information associated with loads on the one or more virtual gateways and associated with loads on the one or more server devices, and at least one of information associated with media content stored in the one or more server devices or information associated with applications stored in the one or more server devices,
receive, functionality information associated with the one or more virtual gateways and the one or more server devices provided in the cloud networks, wherein the functionality information includes information identifying whether the one or more virtual gateways includes functionalities of: a packet data serving node (PDSN), a home agent (HA), a serving general packet radio services (GPRS) support node (SGSN), a gateway GPRS support node (GGSN), a serving gateway (SGW), a packet data network (PDN) gateway (PGW), a multimedia broadcast multicast system gateway (MBMS-GW), or a broadcast multicast service control (BMSC),
receive, from a user equipment, a request for a resource stored in two or more of the cloud networks,
select one cloud network of the two or more of the cloud networks to serve the request based on a comparison of the load information or the functionality information associated with the one or more virtual gateways and the one or more server devices provided in each of the two or more of the cloud networks, and
provide, to the user equipment, an indication of the selected cloud network,
wherein, in response to the indication, the user equipment connects to the selected cloud network via a first base station and receives the resource when the user equipment is in a first location, wherein the user equipment connects to the selected cloud network via a second base station, and wherein an interface moves from between the first base station and the selected cloud network to between the second base station and the selected cloud network without an Internet Protocol handover, when the user equipment moves from the first location to a second location.

16. The computer-readable medium of claim 15, wherein the load information includes:

the bandwidth usage information associated with the loads provided on the one or more virtual gateways or the one or more server devices, the information associated with the media content stored in the one or more server devices, and the information associated with the applications stored in the one or more server devices.

17. The computer-readable medium of claim 15, where the functionality information further includes information associated with additional functionalities of the one or more virtual gateways or server devices provided in the plurality of cloud networks.

18. The computer-readable medium of claim 15, wherein the resource includes:

a combination of the media content and services associated with the applications.

19. The computer-readable medium of claim 15, wherein each of the virtual gateways includes functionalities of: the PDSN, the HA, the SGSN, the GGSN, the SGW, the PGW, the MBMS-GW, and the BMSC.

20. The computer-readable medium of claim 15, where wherein the user equipment is connected to a first cloud network of the cloud networks, and wherein the computer-readable medium further comprises:

one or more instructions that, when executed by the processor of the device, cause the processor to:

provide, to a domain name server (DNS) device, a query requesting a location of the resource, receive, from the DNS device and in response to the query, an indication that the resource is located in a second cloud network of the cloud networks, and provide, to the user equipment, a command instructing the user equipment to connect to the second cloud network.

21. The computer-readable medium of claim 20, where the user equipment, based on the command, connects to a virtual gateway of the second cloud network and receives the resource from the second cloud network.

* * * * *